United States Patent
Gianchandani et al.

(10) Patent No.: US 6,594,994 B2
(45) Date of Patent: Jul. 22, 2003

(54) MICROMECHANICAL ACTUATION APPARATUS

(75) Inventors: Yogesh B. Gianchandani, Madison, WI (US); Joel A. Hetrick, Ann Arbor, MI (US); Larry Li-Yang Chu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/872,780

(22) Filed: Jun. 1, 2001

(65) Prior Publication Data

US 2003/0024243 A1 Feb. 6, 2003

(51) Int. Cl.[7] .................................................. F01B 29/10
(52) U.S. Cl. ........................................ 60/527; 60/528
(58) Field of Search ............ 60/527, 528; 310/40 MM, 310/309, 307

(56) References Cited

U.S. PATENT DOCUMENTS

| | | | | |
|---|---|---|---|---|
| 5,122,852 A | * | 6/1992 | Chang et al. | 257/184 |
| 5,206,983 A | | 5/1993 | Guckel et al. | |
| 5,378,583 A | | 1/1995 | Guckel et al. | |
| 5,491,604 A | * | 2/1996 | Nguyen et al. | 331/116 M |
| 5,649,454 A | * | 7/1997 | Midha et al. | 267/160 |
| 6,175,170 B1 | | 1/2001 | Kota et al. | |
| 6,360,539 B1 | * | 3/2002 | Hill et al. | 310/306 |

OTHER PUBLICATIONS

J. S. Park, et al., "Long Throw Rotary Output Electro–Thermal Actuators Based on Bent–Beam Suspensions," IEEE Int. Conference on Micro Electro Mechanical Systems (MEMS '00), Miyazaki, Japan, Jan. 2000.

Sridhar Kota, et al., "Synthesizing High–Performance Compliant Stroke Amplification Systems for MEMS,", IEEE Int. Conference on Micro Electro Mechanical Systems (MEMS '00), Miyazaki, Japan, Jan. 2000.

M. Steven Rodgers, et al., "A New Class of High Force, Low–Voltage, Compliant Actuation Systems," Solid State Sensor and Actuator Workshop, Hilton Head Island, South Carolina, Jun. 4–8, 2000.

(List continued on next page.)

*Primary Examiner*—Hoang Nguyen
(74) *Attorney, Agent, or Firm*—Foley & Lardner (57) ABSTRACT

Micromechanical actuation apparatus includes a substrate with an actuator mounted on the substrate and a micro-transmission mounted on the substrate coupled to the electrothermal actuator. The actuator, such as an electrothermal actuator, is responsive to electrical power to drive two output beams inwardly or outwardly in opposite directions. The micro-transmission couples the force from the two output beams and transmits the displacement of the output beams to an output node of the micro-transmission. The amplification of the micro-transmission provides a much larger displacement of a beam connected to the output node than the displacement of the output beams of the actuator.

18 Claims, 7 Drawing Sheets

OTHER PUBLICATIONS

Larry L. Chu, et al., "Electro–Thermal Actuators Using Optimized Compliant Micro–Transmissions as Rectilinear Motion Amplifiers," Solid State Sensor and Actuator Workshop, Hilton Head Island, South Carolina, Jun. 4–8, 2000.

H. Guckel, et al., "Thermo–Magnetic Metal Flexure Actuators," Solid–State Sensor & Actuator Workshop, Hilton Head, South Carolina, Jun., 1992, pp. 73–75.

Yogesh B. Gianchandani, et al., "A Bulk Silicon Dissolved Wafer Process for Microelectromechanical Devices," J. of Microelectromechanical Systems, vol. 1, No. 2, Jun., 1992, pp. 77–85.

G.K. Ananthasuresh, et al., "Strategies for Systematic Synthesis of Compliant MEMS," Dynamic Systems and Control, DSC–vol. 55–2, ASME Winter Annual Meeting, Chicago, Illinois, Nov., 1994, pp. 677–686.

Ole Sigmund, "Tailoring Materials with Prescribed Elastic Properties," Mechanics of Materials, vol. 20, 1995, pp. 351–368.

Shinji Nishiwaki, et al., "Topology Optimization of Compliant Mechanisms Using the Homogenization Method," Intl. J. Numerical Methods in Engineering, vol. 42, No. 3, 1998, pp. 535–559.

H. Guckel, "High–Aspect Ratio Micromachining Via Deep X–Ray Lithography," Proceedings of the IEEE, vol. 86, No. 8, Aug., 1998, pp. 1586–1593.

Jacques Jonsmann, et al., "Compliant Thermal Microactuators," Sensors and Actuators, vol. 76, 1999, pp. 463–469.

J. Hetrick, A Unified Approach for Topological and Dimensional Synthesis of Compliant Mechanisms, Ph.D. Thesis, Univ. of Michigan, Ann Arbor, Michigan, 1999, pp. 103–105 and 125–127.

Timothy Moulton, et al., "Micromechanical Devices with Embedded Electro–Thermal–Compliant Actuation," MEMS–vol. 1, ASME International Mechanical Engineering Conference and Exposition, MEMS, Nashville, Tennessee, Nov., 1999, pp. 553–560.

L. Que, et al., "Bent–Beam Electro–Thermal Actuators for High Force Applications," IEEE Intl. Conf. on MEMS, Orlando, Florida, Jan., 1999, pp. 31–36.

Sridhar Kota, et al., "Tailoring Unconventional Actuators Using Compliant Transmissions: Design Methods and Applications," IEEE/ASME Transactions on Mechatronics, vol. 4, No. 4, Dec., 1999, pp. 396–408.

Larry L. Chu, et al., "Temperature Coefficients of Material Properties for Electrodeposited MEMS," IEEE Intl. Conf. on MEMS, Interlaken, Jan., 2001, pp. 68–71.

\* cited by examiner

MICROMECHANICAL ACTUATION APPARATUS

This invention was made with United States government support awarded by the following agency: NSF Grant No: 9985422. The United States has certain rights in this invention.

FIELD OF THE INVENTION

This invention pertains generally to the field of micro-electro-mechanical systems, to actuators for such systems, and particularly to electrothermal actuators and rectilinear transmissions for such actuators.

BACKGROUND OF THE INVENTION

Electrothermal actuators have several desirable characteristics for use in micro-electro-mechanical systems (MEMS), including high output forces, low actuation voltages, and electrically conductive structural materials. Simple and cascaded bent-beam electrothermal actuators have been used for rectilinear motion parallel to the substrate plane. See, L. Que, et al., "Bent-Beam Electro-Thermal Actuators for High Force Applications," IEEE Intl. Conf. on Micro Electro Mechanical Systems (MEMS '99), Orlando, Fla., January 1999; J. S. Park, et al., "Long Throw and Rotary Output Electro-Thermal Actuators Based on Bent-Beam Suspensions," IEEE Intl. Conf. on Micro Electro Mechanical Systems (MEMS '00), Miyazaki, Japan, January 2000. Such devices have produced maximum displacements and maximum blocking forces in the range of 8 $\mu$m and 2.5 mN, respectively, for a silicon device of 2,000 $\mu$m length, 6 $\mu$m width, 4.5 $\mu$m thickness, and 0.2 radian bending angle, operating at 400° C. For many applications, a longer displacement is necessary, a smaller force is adequate, and the operating speed of incremental mechanisms such as inchworms is insufficient.

Compliant mechanisms have been proposed as transmission systems for MEMS applications. Compliant mechanisms are structures that deform elastically to transmit a force or displacement. See, S. Kota, et al, "Tailoring Unconventional Actuators Using Compliant Transmissions: Design Methods and Applications," IEEE/ASME Trans. on Mechatronics, Vol. 4, No. 4, 1999, pp. 396–408. Advantages of compliant mechanisms include the elimination of the friction, wear, and backlash that are common in conventional transmission systems that have mechanical joints. Because of their monolithic construction, compliant mechanisms are also easier to fabricate at the micro-scale level, making them attractive for MEMS applications. Compliant transmissions have been proposed for utilization with electrothermal actuators. See, T. Moulten, et al., "Micromechanical Devices with Embedded Electro-Thermal-Compliant Actuation," MEMS—Vol. 1, ASME International Mechanical Engineering Conference and Exposition, MEMS, Nashville, Tenn., November 1999, pp. 553–560; J. Jonsmann, et al., "Compliant Thermal Microactuators," Sensors and Actuators (A), Vol. 76, 1999, pp. 463–469. A significant issue in the construction of useful electrothermal actuator systems with compliant mechanisms is the force-displacement trade-off that is faced where the application requires much larger displacements than are typically available from electrothermal actuators. For example, for applications such as optical switching in which an incoming optical fiber is moved between one of two output fibers, the displacement requirement is on the order of 100 $\mu$m or more, which is 10–20 times the output displacement of typical electrothermal actuators.

SUMMARY OF THE INVENTION

The micromechanical electrothermal actuation apparatus of the invention is well suited to micromechanical applications in which rectilinear displacements on the order of 100 $\mu$m or more are required, such as in optical fiber switches. The actuation apparatus is compact and may be formed to occupy an area a few millimeters or less on a side, with relatively low voltage power sources required.

The actuation apparatus of the invention includes a substrate having a surface, with an actuator mounted on the substrate having two output beams and responsive to electrical power supplied thereto to drive the two output beams inwardly or outwardly in opposite directions. The actuator may comprise an electrothermal actuator. A micro-transmission is also mounted on the substrate and comprises a mesh of compliant structural beam elements connected together at nodes. The micro-transmission has two input nodes, each of which is attached to one of the two output beams of the actuator, which are displaced as the output beams are driven inwardly or outwardly. The micro-transmission couples the force from the two output beams and transmits the displacement of the output beams to an output node with an amplification of the output node displacement with respect to the displacement of the input nodes. A very large displacement amplification factor, in the range of 10 to 20 or greater, may be provided by the micro-transmission. Because the micro-transmission receives displacements from two output beams of the actuator and couples the force from these two beams together, the force applied to the output node of the transmission is greater than would be available from an actuator providing displacement of a single output beam.

An exemplary actuator that may be utilized in the invention is an electrothermal actuator comprising two anchor mounts mounted on the substrate spaced from each other and two pairs of beam elements, with each pair of beam elements joined at a vertex to form an inwardly or outwardly bent beam extending between the two anchor mounts. The actuator output beams are attached to the vertices. Current can be passed through the beam elements between the anchor mounts to cause heating and expansion of the beam elements, causing each vertex joining each of the pairs of beam elements to be displaced inwardly or outwardly, thereby displacing the output beams inwardly or outwardly.

The beam elements of the micro-transmission may include a symmetrical transmission structure including, for each output beam of the actuator, three beam elements forming a triangle one vertex of which is connected to an output beam of the actuator, an anchor mounted to the substrate, a beam element connected from the anchor to join a second vertex of the triangle, and a beam element joined to the third vertex of the triangle and extending to a connection at the output node of the micro-transmission. The length, thickness and orientation of the beam elements in the micro-transmission are preferably optimized to provide a selected amplification of displacement from the input nodes to the output node. The beam elements in the actuator and in the micro-transmission may be formed of various micromechanical materials, including crystalline silicon and electroplated metal such as nickel. Preferably, the beam elements have widths of 50 $\mu$m or less, thickness of 500 $\mu$m or less, and with the overall area of the actuation apparatus on the substrate less than one $cm^2$.

Further objects, features and advantages of the invention will be apparent from the following detailed description when taken in conjunction with the accompanying drawings.

DETAILED DESCRIPTION OF THE INVENTION

Figure 1:
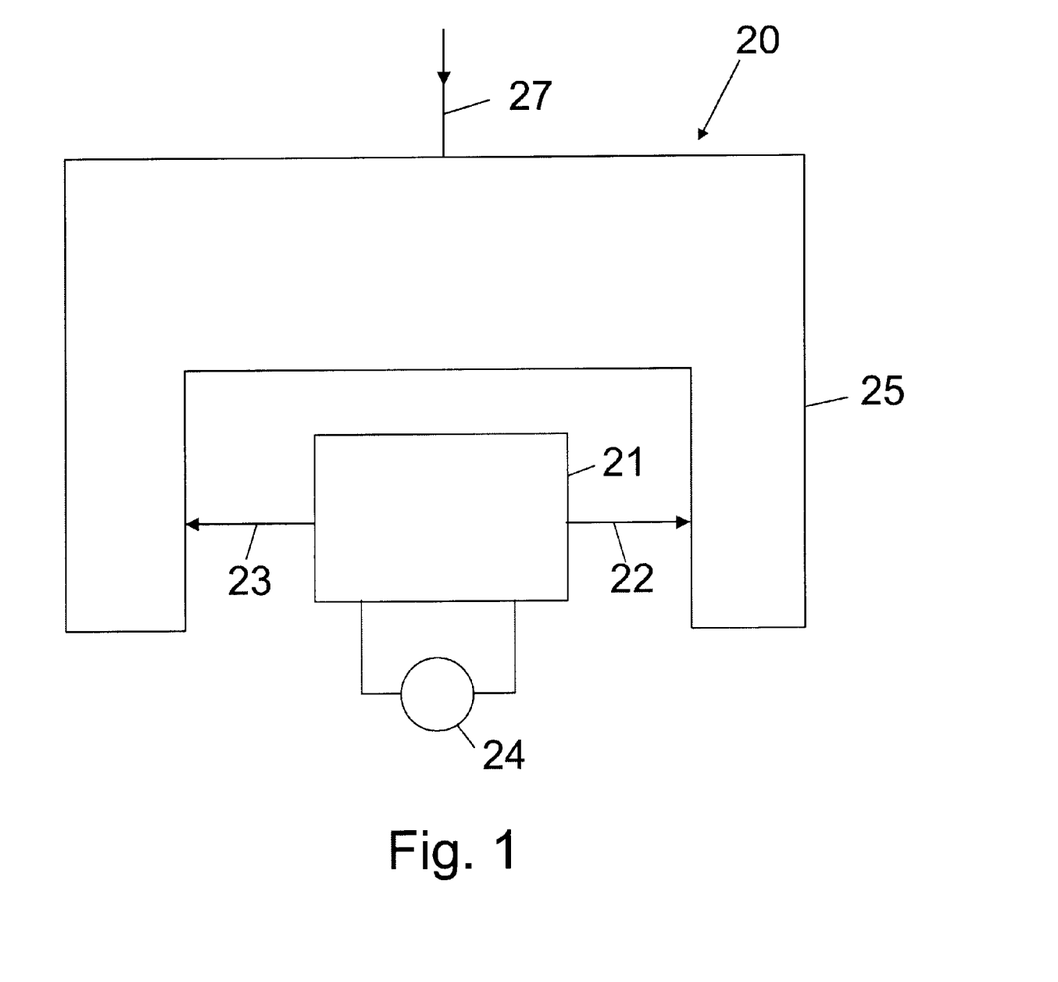
FIG. 1 is a simplified schematic view of micromechanical actuation apparatus in accordance with the invention.

With reference to the drawings, a micromechanical actuation apparatus in accordance with the invention is shown generally at 20 in FIG. 1 in schematic form. The apparatus 20 includes an actuator 21 which provides relatively short stroke, high output force on output beams 22 and 23 that displace laterally inwardly or outwardly along a line preferably coincident with each other, and preferably with symmetric forces and displacements. A preferred actuator is an electrothermal actuator, and the invention is described below for exemplification with reference to an electrothermal actuator. However, the invention may also utilize other high output force actuators such as parallel plate capacitive actuators. Electrical power is selectively provided from a power source 24 to the actuator 21 to cause inward or outward displacement of the output beams 22 and 23. The present invention may be utilized with relatively low voltage power sources, e.g., at 15 volts DC output. The displacements of the output beams 22 and 23 are provided to a rectilinear transmission system 25 which converts the short stroke, high force displacements of the output beams 22 and 23 to a lower force, longer stroke displacement of a transmission output beam 27, with the displacement of the transmission output beam 27 occurring in a direction orthogonal to the displacements of the output beams 22 and 23 of the actuator 21. The forces provided by the two output beams 22 and 23 of the actuator 21 are coupled by the transmission 25 so that the output force available at the transmission output beam 27 is effectively twice the force that would be available if a force from only a single actuator output beam 22 or 23 were provided to the transmission system. The present invention preferably implements an optimized design for the compliant micro-transmission 25 to obtain a desired displacement of the transmission output beam 27 given the available displacements of the actuator output beams 22 and 23 and the available displacement force from the actuator.

The design procedure for the micro-transmission 25 may be broken into topology synthesis and dimensional synthesis. Each stage may be posed as a structural optimization problem, where the objective is to maximize the blocking force and/or unloaded output displacement given all relevant design constraints. The primary characteristics of the actuator 21 are the block force, $F_{block1}$, (i.e., the maximum force at zero displacement) and unloaded output displacement, $d_{out1}$. When the compliant mechanism 25 is coupled to the electrothermal actuator 21, it can transform these two quantities to produce a new block force, $F_{block2}$, and unloaded output displacement, $d_{out2}$. Depending on the design, the compliant transmission mechanism 25 can achieve extreme amplification of the block force or output displacement, as required for the particular application. The amplification factor, A, is expressed as the ratio of the output displacement to the input (actuator) displacement:

$$A = \frac{d_{out2}}{d_{out1}} \quad (1)$$

While amplification change is one method for determining the magnification factor, other methods, such as specifying the ratio of blocking forces, or the slope change two force-displacement relationships, can also be readily accommodated.

Analysis may be performed using structural truss and beam elements along with linear, static finite element theory (for initial analysis, coupled electrical and thermal effects may be neglected). For both topology synthesis and dimensional synthesis, the finite element equilibrium analysis and the constrained optimization problem can be solved using the MATLAB™ software package. Optimization may be performed using MATLAB's Sequential Quadratic Programming (SQP) algorithm. Design derivatives may be calculated using the adjoint variable method and by directly differentiating the stiffness matrix with respect to size and node position design variables.

The generic structural optimization problem (for both topology and dimensional synthesis) is posed as follows:

$$\text{Max } F_{block2} \cdot d_{out2} - P\left(\frac{d_{out2}}{d_{out1}} - A^*\right)^2 \quad (2)$$

subject to:

$\sigma_{axial} - \sigma_{buckling} \leq 0; V - V_{allow} \leq 0$ $h_{min} \leq h_i \leq h_{max}; X_{min} \leq X_j \leq X_{max}; Y_{min} \leq Y_k \leq Y_{max}$ The required amplification factor, A*, is enforced by penalizing the objective function by the penalty factor, P. Buckling is enforced by limiting the maximum axial stress to $\sigma_{buckling}$ based on Euler's buckling criteria, modified for end conditions (during dimensional synthesis). The total volume constraint is enforced by $V_{allow}$. Design variables include element width and node position co-ordinates, denoted by $h_i$, $X_j$, and $Y_k$, respectively. During dimensional synthesis these are given local upper and lower bounds that serve to limit the search space and also enforce fabrication limitations.

To establish the optimal topology of a mechanism, the design domain is discretized using a network of truss elements, defined as a ground structure. The topology optimization process seeks to resize each element thickness until the performance of the structure is maximized. Upon completion, elements that converge to the lower bound are removed yielding the final mechanism topology. The topology synthesis approach described here utilizes a modular ground structure where nodes are allowed to change location within 'wandering limits'. This technique has previously been shown to produce good topology designs that accurately satisfy magnification requirements. See, J. Hetrick, "A Unified Dimensional Synthesis of Compliant Mechanisms," Ph.D. Thesis, University of Michigan, Ann Arbor, Mich., 1999.

Figure 2:
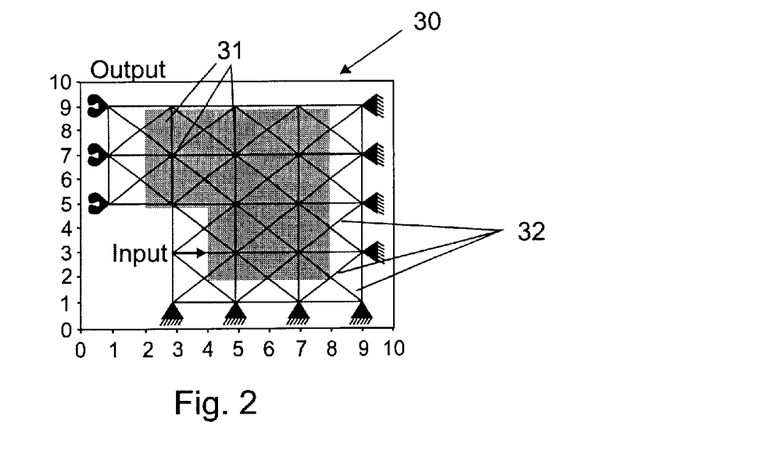
FIG. 2 is a simplified drawing showing an initial full mesh of beam elements that may be analyzed in carrying out the design of a micro-transmission in accordance with the invention.
Figure 3:
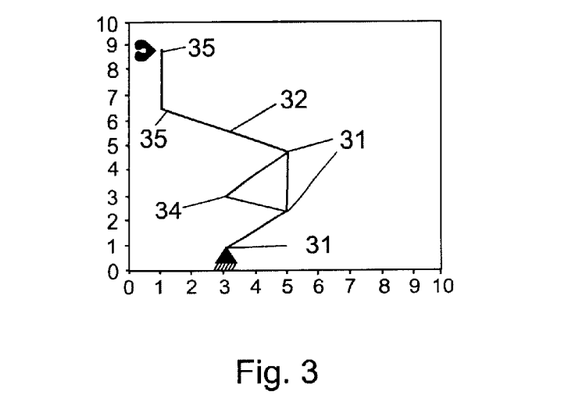
FIG. 3 is a view in a further state of the design process showing an optimized topology of the beam elements required for transmission of the force and displacement from the input node to the output node.

Since the outputs 22 and 23 of the actuator are symmetrical about the axis of motion, the micro-transmission 25 can take advantage of symmetry, which allows only half of the topology to be designed, which lowers computational requirements. For the following example, the modulus was set to 1000, the width was set to 1, the total volume constraint was set to 2, and the lower element bound was set at 1E-4. To achieve the magnification factor of 20, the penalty multiplier was set to 1. FIG. 2 shows the floating-node ground structure 30, discretized using twenty-five nodes and seventy-two beam elements 32; twenty-three nodes were activated, as shown in FIG. 2, and given wandering ranges resulting in one hundred seven design variables (wandering ranges indicated by gray areas). FIG. 3 indicates the optimal topology of the compliant mechanism amplifier, amplifier displacement from the input node 34 to the output node 35 with the elements 32 converging to the lower bound removed.

To proceed with dimensional synthesis, each segment of the topology is re-meshed using arrays of beam elements; the number of elements along an array may be directly controlled by the designer. Exact specifications for the material modulus, out-of-plane thickness, input actuator characteristics, and desired magnification are input into the optimization routine. The designer may choose to activate end nodes of topology segments, allowing for geometric variation. Intermediate nodes along the length of an activated segment are adjusted by maintaining a collinear equidistant relationship.

Figure 4:
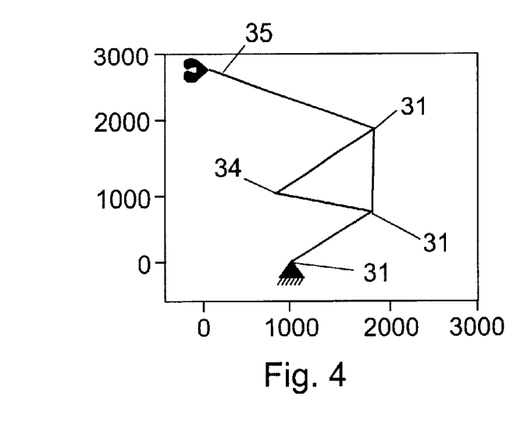
FIG. 4 is a simplified drawing of the optimized beam elements with the beam elements re-meshed for dimensional synthesis.
Figure 5:
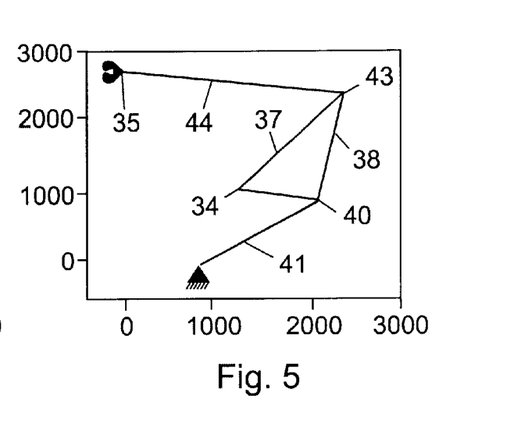
FIG. 5 is a simplified diagram showing the optimized final design of the beam elements for the micro-transmission in accordance with the invention.

FIG. 4 shows the amplifier example from the topology synthesis of FIG. 3 re-meshed for the secondary dimensional synthesis stage. Constraints within the fabrication sequence that pose upper or lower bounds on the various dimensions of the structural components can be defined at this point. In this example, the thickness and the minimum widths of the beam elements 32 were set to 15 $\mu$m. FIG. 5 shows the optimized structure (M=20, P=1, $V_{allow}$=1×10$^6$ $\mu$m$^3$). The input force is applied to the input node 34 which lies at one vertex of a triangle formed by beam elements labeled 37, 38 and 39 in FIG. 5. Another vertex 40 is connected by an element 41 to a fixed node 42. The last vertex 43 is connected by an element 44 to the output node 35. This particular design offers a blocking force of 470 $\mu$N assuming a Young's modulus (E) of 100 GPa, and a free displacement of 51 $\mu$m. The force is proportional to E. Because of the minimum width limitation, substantial energy is spent deforming the compliant transmission (transmission efficiency is 14.1 percent). Larger blocking force and free displacement can be achieved by fabricating more flexible structures with thinner beam widths (within buckling limitations).

Figure 6:
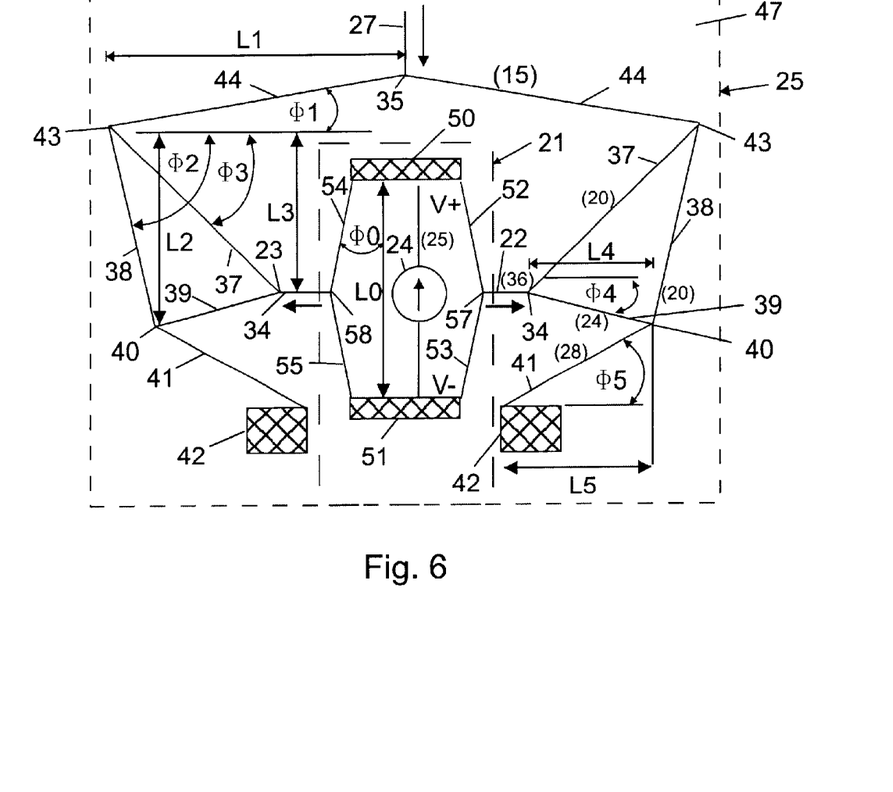
FIG. 6 is a plan view of a micromechanical actuation apparatus in accordance with the invention.

An example of a synthesized design is shown in FIG. 6. The entire mesh-like mechanism 25 is suspended above a substrate 47 and attached to the substrate only at the anchors 42. The electrothermal actuator 21 may be formed as shown in FIG. 6 with two end mounts 50 and 51 that are secured to the substrate 47, and pairs of beams 52, 53 and 54, 55 which extend from the mounts 50 and 51 and are joined to the output beams 22 and 23 at vertices 57 and 58, respectively. Current is supplied from a power source 24 to the electrically conductive mounts 50 and 51, passing through and heating the beams 52, 53 and 54,55, resulting in expansion of these beams and outward displacement of the vertices 57 and 58 and of the output beams 22 and 23 attached thereto. The symmetry of the design confines the current to the beams 52, 53 and 54, 55, which provide symmetrical lateral input displacements to the micro-transmission 25. This generates an axial displacement at the output node 35, as shown. Incorporation of stress constraints in eqn. (2) to reduce the propensity for out-of-plane buckling results in the selective widening of beams that are in compression when actuated (beam widths are shown in parenthesis in FIG. 6). In addition, the longest beam 44, which is attached to the output node 35, is in tension.

Figure 7:
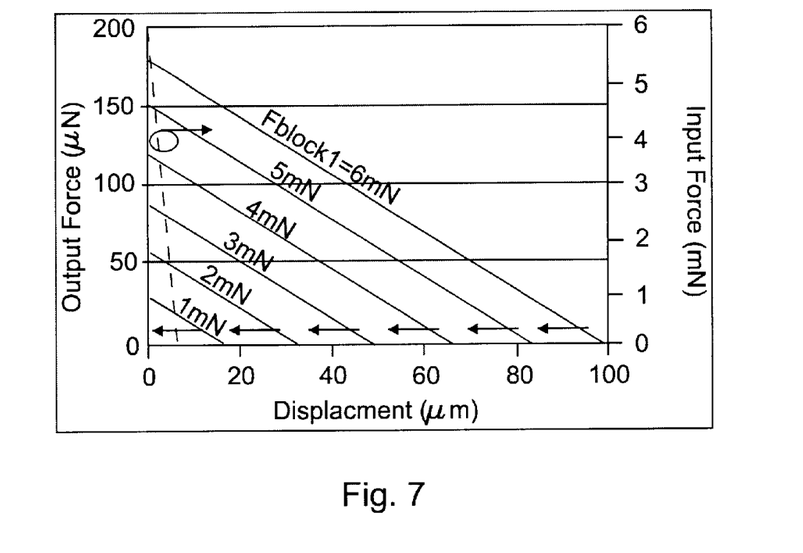
FIG. 7 are graphs showing load lines for an actuator driving one-half of the micro-transmission of FIG. 6.

FIG. 7 shows results from the finite element analysis (FEA) of a device of the type shown in FIG. 6. Since the device is laterally symmetric, only half the structure was modeled. The dimensional variables were as denoted for device L1 in Table I below. Dimensions of fabricated devices are as defined in FIG. 6. $R_w$ denotes ratio of actual beam widths to those indicated. The structural material was 11.5 $\mu$m thick p$^{++}$ Si.

TABLE I

| Dev # | L0 $\mu$m | L1 $\mu$m | L2 $\mu$m | L3 $\mu$m | L4 $\mu$m | L5 $\mu$m | $R_w$ |
|---|---|---|---|---|---|---|---|
| L1 | 2450 | 2415 | 1750 | 1400 | 1000 | 1210 | 1.0 |
| L2 | 2450 | 2180 | 1450 | 1150 | 985 | 1105 | 1.0 |
| L3 | 1838 | 1182 | 1313 | 1050 | 750 | 908 | 0.71 |
| S1 | 1225 | 1208 | 875 | 700 | 500 | 605 | 0.42 |

Material properties reflected the use of p$^{++}$ Si as the structural material. The thickness of the entire structure was assumed to be 11.5 $\mu$m. FIG. 7 shows the load line of an individual bent-beam actuator 21, along with a family of load lines at the output of the mechanism 25 (for one side of the micro-transmission) under different levels of actuation. The level of actuation, which is controlled by the electrical power applied to the electrothermal actuator 21, is represented by the parameter $F_{block1}$. It is clear from this figure that the micro-transmission converts a load line which has force and displacement axis intercepts of 6 mN and 5.8 $\mu$m, to those which have intercepts in range of 250 $\mu$N and 100 $\mu$m, respectively. It is important to note that the FEA was performed for only half the structure, and the actual output force is twice that indicated in FIG. 7. The calculated amplification factor, $A_{calc}$, is 17.5 for this device.

From a design perspective, it is convenient to begin with the target force and displacement required at the output of the mechanism. If amplification factor A and magnification factor M are known for the selected transmission, the force and displacement required at its input can be calculated. The magnification factor M is defined as $$M = \sqrt{\frac{d_{max2}/F_{block1}}{d_{max1}/F_{block2}}}$$

The bent-beam actuator 21 can then be designed using the analytical equations for its unloaded displacement ($d_{out}$) and maximum force ($F_{block1}$), as described in J. S. Park, et al., supra. It must be able to provide the force and displacement required by the transmission 25 without buckling.

Mechanisms as shown in FIG. 6 were fabricated from $p^{++}$ Si and electroplated Ni to demonstrate the operation of the micro-transmissions. The $p^{++}$ Si devices were 11.5 μm thick, and were fabricated on glass wafers by the dissolved wafer process. See, Y. Gianchandani, K. Najafi, "A Bulk Silicon Dissolved Wafer Process for Microelectromechanical Systems," IEEE J. of Microelectromechanical Systems, 1(2), 1992, pp. 77–85. The dimensional parameters of fabricated designs are as listed in Table I. A current was passed through the electrothermal actuators 21 and the displacements were measured at both the input and output of the micro-transmission 25. The measurements were taken by a calibrated visual method, with an uncertainty of <0.5 μm. The results are summarized in Table II below, along with calculated performance. Calculations assume p++ Si structural material, uniform ΔT=500° C., 3 ppm/K expansion coeff., and E=180 GPa.

TABLE II

| | | Calculated | | | Measured | |
|---|---|---|---|---|---|---|
| Dev. # | I mA | $d_{out2}$ μm | $F_{block2}$ μN | $A_{calc}$ | $A_{meas}$ | $D_{out2}$ μm |
| L1 | 105 | 102 | 178 | 17.5 | 17.0 | 100.4 |
| L2 | 90 | 57.1 | 514 | 9.1 | 8.6 | 34.1 |
| L3 | 86.2 | | | 17.5 | 21.4 | 85.0 |
| S1 | 47.6 | 53.6 | 64.0 | 17.6 | 18.6 | 55.0 |

Figure 9:
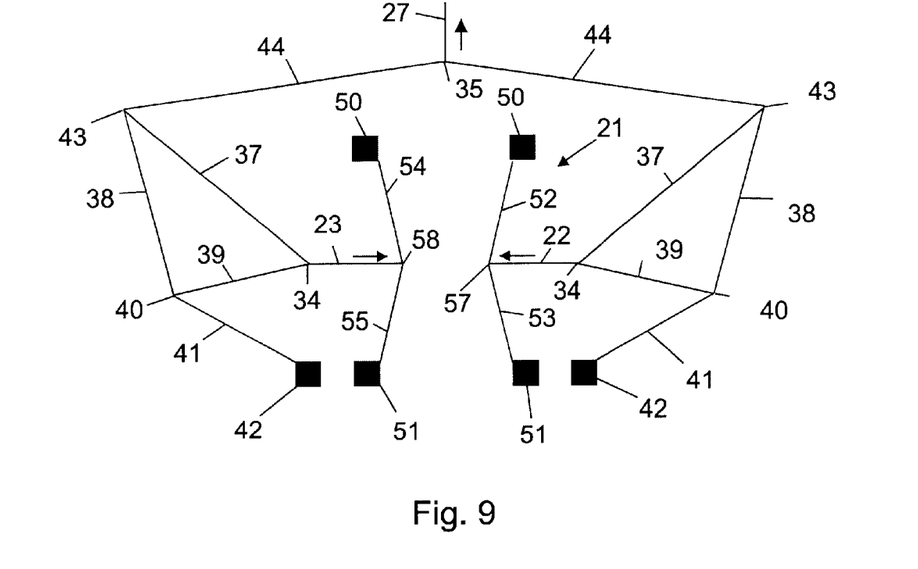
FIG. 9 is a plan view of a modified embodiment of the actuation apparatus of FIG. 6 with kinematic inversion of elements.

For example, device L1 achieved 100.4 μm output displacement when driven by 105 mA of current, and the measured amplification factor, $A_{means}$ 17.0. This compares very well with the predicted value of 17.5. The detailed response of this device is shown in FIG. 9. Its best use appears to be at output displacements below 90 μm, for which the input power is about 650 mW. Device L3 achieved 86.2 μm output displacement when driven by 85 mA current. The $a_{meas}$ of this device of 21.4 was higher than predicted, possibly because a portion of the beams within the transmission 25 may have been heated.

Figure 8:
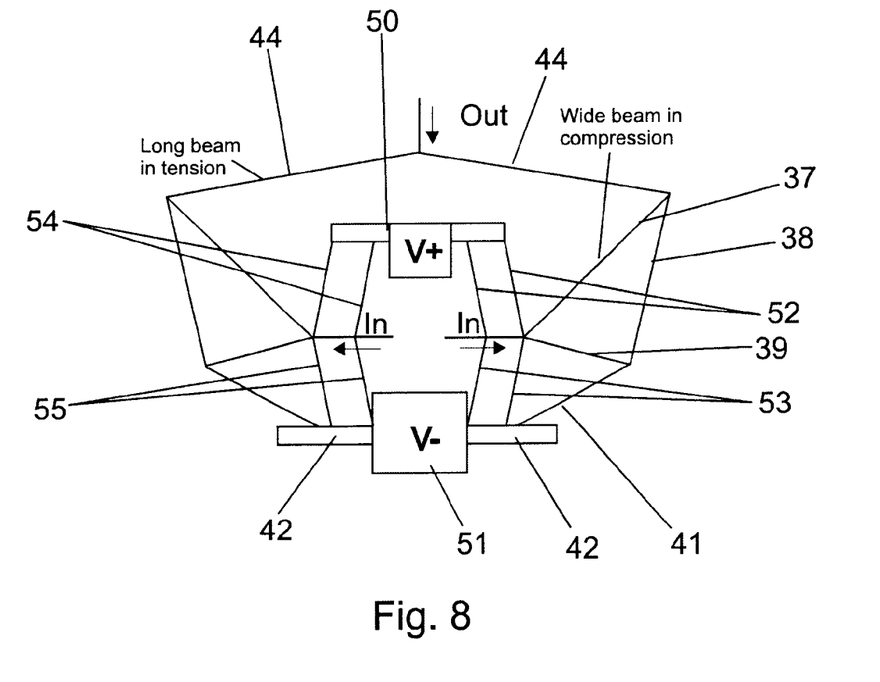
FIG. 8 is a plan view showing a modified embodiment of a micromechanical actuation apparatus in accordance with the invention.

Electroplated Ni samples were also fabricated using the LIGA process. For a description of the LIGA process, see H. Guckel, "High-Aspect-Ratio Micromachining Via Deep X-Ray Lithography," Proc. IEEE, Vol. 86, No. 8, 1998, pp. 1586–1593, and U.S. Pat. Nos. 5,208,983 and 5,378,583, incorporated by reference. These devices were 55 μm thick and were fabricated on a glass substrate as well. A 2 μm thick Cu sacrificial layer also served as the base for electroplating. For the electroplating conditions used, E=115±10 GPa. A sample device is shown in FIG. 8. In this design, the micro-transmission 25 was driven by two pairs of bent-beams 52, 53 and 54, 55 at each lateral input. A non-resonant displacement of 85 μm was measured at an input of 0.9V. For this device, $A_{calc}$=8.2, and $A_{meas}$=9.3.

Similar to rigid link mechanisms, compliant mechanisms maintain like-functionality when they are transformed via kinematic inversion and/or geometrically arranged as conjugate pairs. Note that the displacement amplification of the structure is dependent on the topology and geometry (length and angles) of each element. The performance (efficiency), however, is related to the relative thickness of each individual member.

Figure 10:
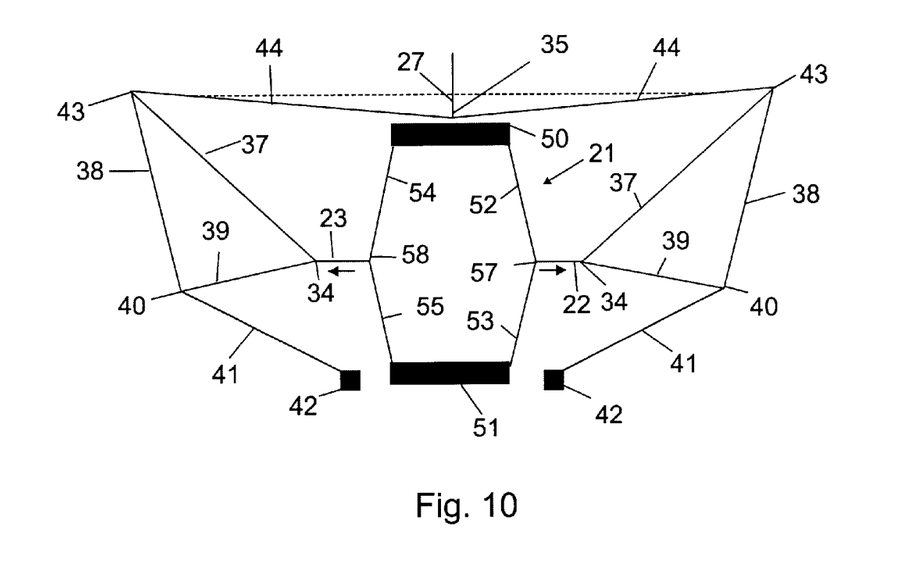
FIG. 10 is a plan view of a further modified embodiment of the actuation apparatus of FIG. 6 with kinematic inversion of elements.

Kinematic inversion describes the ability of a compliant mechanism to provide output motion that is exactly opposite—provided that the input motion is reversed. A kinematic inversion of the structure of FIG. 6 is shown in FIG. 9. In this case, the actuator beams 52, 53 and 54, 55 move inwardly, and the output node 35 and the output beam 27 move outwardly. The beams 44 in this case are in compression. Similarly, the geometry of compliant members can also in some cases be "reflected" to provide similar behavior, as shown in FIG. 10. In this case, the beam members 44 are directed inwardly toward the actuator 21, and the output node 35 moves outwardly as the actuator output beams move outwardly. This results in rectilinear amplifiers that behave the same (within a few performance percent) as the device shown in FIG. 6, except that the relative output motion at the node 35 is reversed. It is possible that re-optimizing the device may create changes in the mechanism's beam element geometry and thickness; however, the topology (the number of members and their interconnection) would remain the same.

Figure 11:
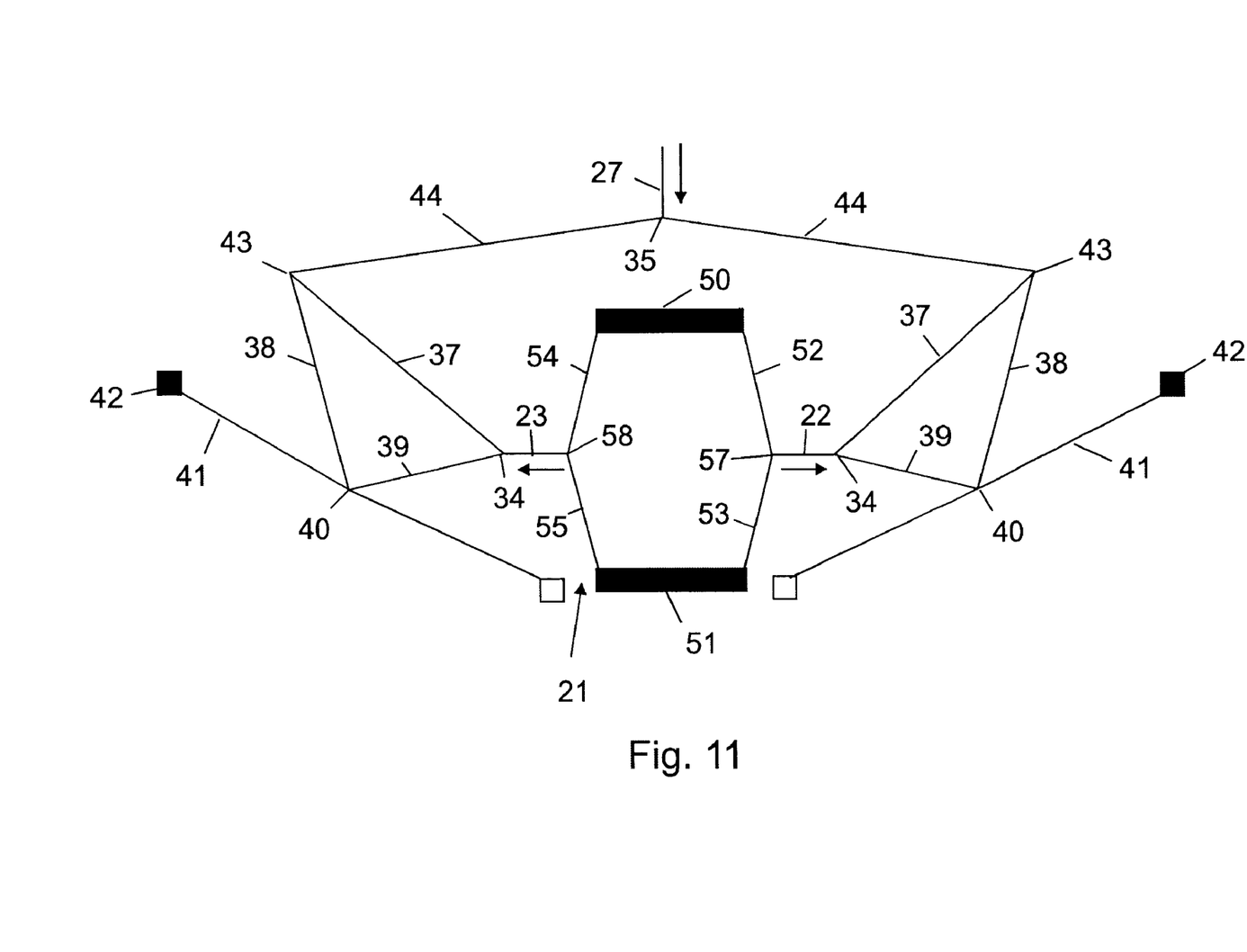
FIG. 11 is a plan view of another embodiment of actuation apparatus which has an arrangement of transmission beam elements that is a conjugate of that shown in FIG. 6.
Figure 12:
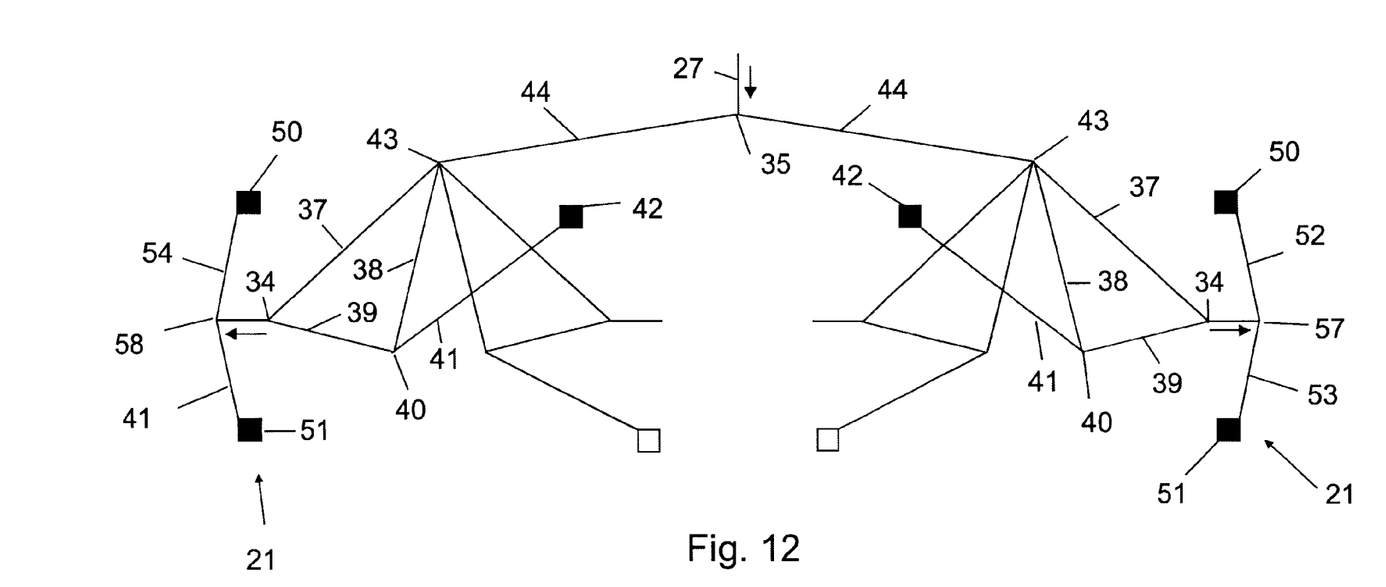
FIG. 12 is a plan view of another embodiment of actuation apparatus which has an arrangement of transmission beam elements and electrothermal actuator elements that is a conjugate of that shown in FIG. 6.

Compliant mechanisms also display conjugate nature found in rigid link mechanisms. Compliant mechanisms efficiently transfer forces and motions by transmitting forces along members in tension and compression while providing motion via transverse strain (bending) within these members. Rearranging the structure such that the preferred orientation of force transmission to strain transmission is identical results in conjugate mechanism. FIG. 11 shows actuation apparatus having a conjugate of the transmission of the structure of FIG. 6, and FIG. 12 shows an actuation apparatus having a conjugate of both the transmission and the actuator elements of the structure of FIG. 6. The structures of FIGS. 11 and 12 will behave the same (again within a few performance percent) as the structure of FIG. 6 while taking on different structural layouts (different layouts may be more advantageous for certain applications). Again, it is possible that re-optimizing the device may create changes in the mechanism's geometry and thickness; however, the topology (the number of members and their interconnection) would remain the same. The invention may also be embodied in structures which are both conjugates and kinematic inversions of the foregoing designs.

It is understood that the invention is not confined to the particular embodiments set forth herein for exemplification, but embraces all such forms thereof that come within the scope of the following claims.

What is claimed is:

1. Micromechanical actuation apparatus comprising:
    (a) a substrate having a surface;
    (b) an actuator mounted on the substrate having two output beams and responsive to electrical power supplied thereto to drive the two output beams inwardly or outwardly in opposite directions; and
    (c) a micro-transmission mounted on the substrate comprising a mesh of compliant structural beam elements connected together at nodes, the micro-transmission having two input nodes and one output node, the input nodes attached to the output beams of the actuator to be displaced as the actuator output beams are driven inwardly or outwardly, the micro-transmission coupling the force from the two actuator output beams and transmitting the displacement of the actuator output beams to the output node with an amplification of the output node displacement with respect to the displacement of the input nodes, the micromechanical actuation apparatus formed to have an area on the substrate of less than one cm².

2. The actuation apparatus of claim 1 wherein the actuator is an electrothermal actuator.

3. The actuation apparatus of claim 2 wherein the electrothermal actuator comprises at least two anchor mounts mounted on the substrate spaced from each other and two pairs of beam elements, each pair of beam elements joined at a vertex to form an inwardly or outwardly bent beam extending between the anchor mounts such that current can be passed through the beam elements between the anchor mounts, one vertex joining one of the pairs of beam elements connected to one of the output beams and the vertex joining the other pair of beam elements connected to the other of the output beams.

4. The actuation apparatus of claim 1 wherein the beam elements of the micro-transmission include for each output beam of the thermal actuator, three beam elements forming a triangle having a vertex that is connected to an output beam of the actuator, an anchor mounted on the substrate, a beam element connected from the anchor to join a second vertex of the triangle, and a beam element joined to the third vertex of the triangle and extending to a connection at the output node of the micro-transmission.

5. The actuation apparatus of claim 4 wherein the length, thickness, and orientation of the beam elements in the micro-transmission are optimized to provide a selected amplification of displacement from the input nodes to the output node.

6. The actuation apparatus of claim 1 wherein the beam elements are formed of electroplated metal.

7. The actuation apparatus of claim 1 wherein the beam elements are formed of crystalline silicon.

8. The actuation apparatus of claim 1 wherein the beam elements have widths of 50 $\mu$m or less.

9. The actuation apparatus of claim 1 wherein the beam elements have a thickness of 500 $\mu$m or less.

10. Micromechanical actuation apparatus comprising:

(a) a substrate having a surface;

(b) an actuator mounted on the substrate having two output beams and responsive to electrical power supplied thereto to drive the two output beams inwardly or outwardly in opposite directions; and (c) a micro-transmission mounted on the substrate comprising a mesh of compliant structural beam elements connected together at nodes, the micro-transmission having two input nodes and one output node, the input nodes attached to the output beams of the actuator to be displaced as the output beams are driven inwardly or outwardly, the micro-transmission coupling the force from the two output beams of the actuator and transmitting the displacement of the actuator output beams to the output node with an amplification of the output node displacement with respect to the displacement of the input nodes, wherein the beam elements of the micro-transmission include, for each output beam of the actuator, three beam elements forming a triangle having a vertex that is connected to an output beam of the actuator, an anchor mounted on the substrate, further including another beam element connected from the anchor to join a second vertex of the triangle and another beam element joined to the third vertex of the triangle and extending to a connection at the output node of the micro-transmission.

11. The actuation apparatus of claim 10 wherein the actuation apparatus is formed to have an area on the substrate of less than one cm².

12. The actuation apparatus of claim 10 wherein the actuator is an electrothermal actuator.

13. The actuation apparatus of claim 12 wherein the electrothermal actuator comprises at least two anchor mounts mounted on the substrate spaced from each other and two pairs of beam elements, each pair of beam elements joined at a vertex to form an inwardly or outwardly bent beam extending between the anchor mounts such that current can be passed through the beam elements between the anchor mounts, one vertex joining one of the pairs of beam elements connected to one of the output beams and the vertex joining the other pair of beam elements connected to the other of the output beams.

14. The actuation apparatus of claim 10 wherein the length, thickness, and orientation of the beam elements in the micro-transmission are optimized to provide a selected amplification of displacement from the input nodes to the output node.

15. The actuation apparatus of claim 10 wherein the beam elements are formed of electroplated metal.

16. The actuation apparatus of claim 10 wherein the beam elements are formed of crystalline silicon.

17. The actuation apparatus of claim 10 wherein the beam elements have widths of 50 $\mu$m or less.

18. The actuation apparatus of claim 10 wherein the beam elements have a thickness of 500 $\mu$m or less.

* * * * *